United States Patent

Richter et al.

[11] Patent Number: 5,785,084
[45] Date of Patent: Jul. 28, 1998

[54] FUEL REMOVAL DEVICE

[75] Inventors: Christian Richter, Plochingen; Karl-Heinz Siebels, Stuttgart, both of Germany

[73] Assignee: Daimler-Benz AG, Stuttgart, Germany

[21] Appl. No.: 880,773

[22] Filed: Jun. 23, 1997

[51] Int. Cl.[6] .................................................. B01D 15/00
[52] U.S. Cl. .......................... 137/549; 137/576; 123/510; 123/514
[58] Field of Search ................... 137/549, 592, 137/811, 576; 123/509, 510, 514, 516; 251/345

[56] References Cited

U.S. PATENT DOCUMENTS

| 3,049,171 | 8/1962 | Neuerburg et al. | 137/574 |
|---|---|---|---|
| 4,632,362 | 12/1986 | Lucking | 251/345 |
| 4,878,518 | 11/1989 | Tuckey | 123/510 |
| 4,928,657 | 5/1990 | Asselin | 123/509 |
| 4,971,017 | 11/1990 | Beakley et al. | 123/509 |
| 5,146,901 | 9/1992 | Jones | 123/509 |
| 5,363,827 | 11/1994 | Siekmann | 123/509 |

FOREIGN PATENT DOCUMENTS

| 0 300 910 | 1/1989 | European Pat. Off. . |
|---|---|---|
| 0 340 063 | 11/1989 | European Pat. Off. . |
| 0 533 541 | 3/1993 | European Pat. Off. . |
| 0 652 127 | 5/1995 | European Pat. Off. . |
| 34 08 520 | 9/1984 | Germany . |
| 91 01 313 | 6/1991 | Germany . |
| 91 01 313.5 | 6/1991 | Germany . |
| 42 36 490 | 5/1994 | Germany . |
| 43 20 375 | 12/1994 | Germany . |
| 2 174 651 | 11/1986 | United Kingdom . |

*Primary Examiner*—Denise L. Ferensic
*Assistant Examiner*—John Ball
*Attorney, Agent, or Firm*—Klaus J. Bach

[57] ABSTRACT

In a fuel removal device including a fuel pickup pot for disposition in a vehicle fuel tank, the fuel pickup pot has integrally formed therewith two receptacles extending from the bottom of the pickup pot, one for receiving a filter with a fuel suction line and the other for receiving a fuel return line.

4 Claims, 1 Drawing Sheet

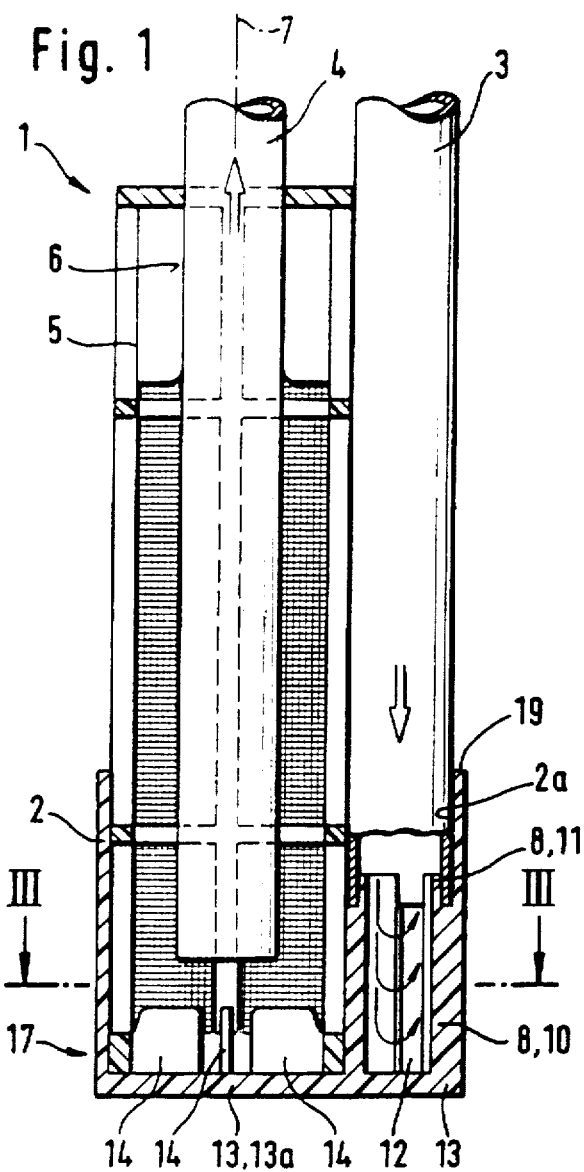
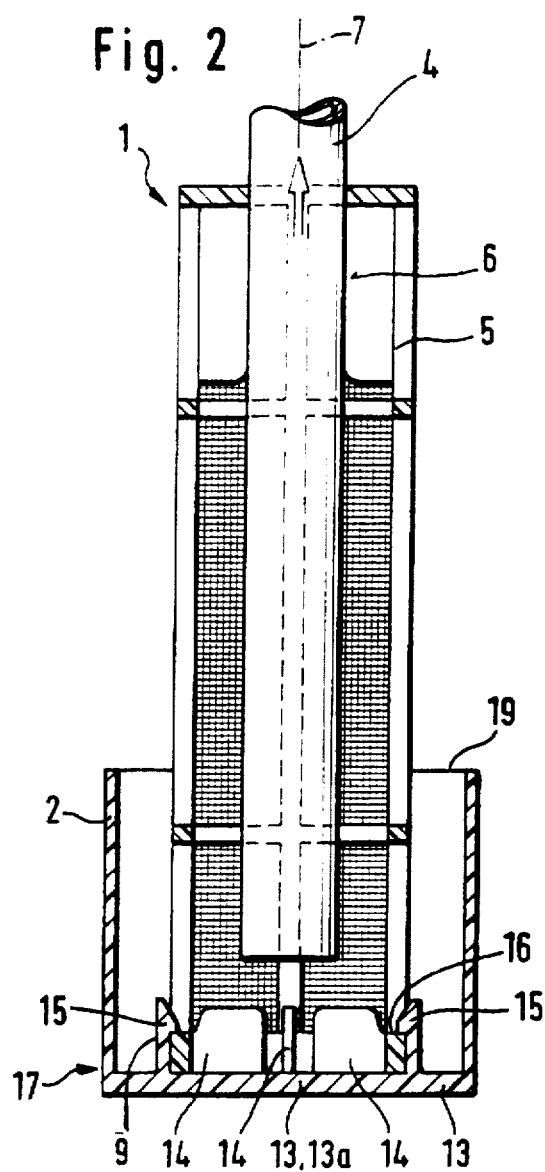
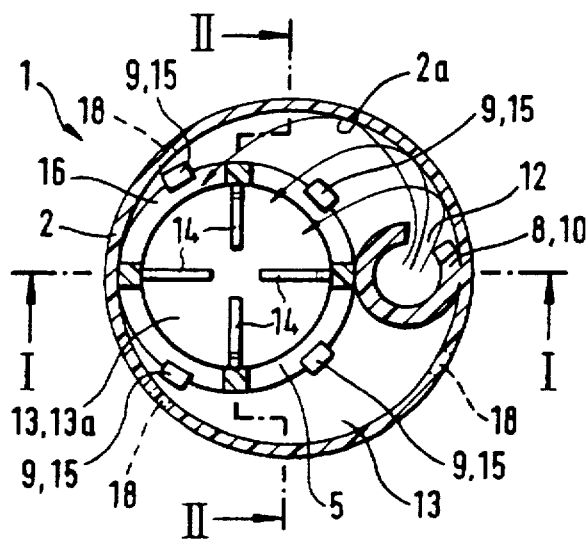
Fig. 1
Fig. 2
Fig. 3

FUEL REMOVAL DEVICE

BACKGROUND OF THE INVENTION

The invention relates to a fuel removal device including a pickup pot which is to be disposed in a fuel tank and which receives the end of a fuel return line and has at its bottom a filter receiving the end of a fuel suction line.

DE 91 01 313 V1 discloses a fuel removal device for removing fuel from a fuel tank. The removal device comprises a pickup pot to be disposed in a fuel tank and receiving a fuel suction line and a fuel return line. A connector for the fuel return line is inserted into the wall of the pickup pot as a separate building component. It is not indicated in this publication how the filter is mounted in the pickup pot.

With the known arrangements the mounting of the fuel lines and the filter is relatively cumbersome and expensive.

For further general background information reference is made to EP 0 300 910 B1, DE 42 36 490 C1, DE 43 20 375 A1 and DE 34 08 520 A1.

It is the object of the present invention to provide a fuel removal device which requires a relatively small amount of components and is therefore relatively simple and inexpensive to manufacture and to assemble with the filter and the pipes for the removal and return of fuel and which furthermore is compact and requires little installation space.

SUMMARY OF THE INVENTION

In a fuel removal device including a fuel pickup pot for disposition in a vehicle fuel tank, the fuel pickup pot has integrally formed therewith two receptacles extending from the bottom of the pickup pot, one for receiving a filter with a fuel suction line and the other for receiving a fuel return line.

A particular advantage of the fuel removal device according to the invention resides in its simple design which greatly facilitates manufacture of the device. It also provides for simple assembly of the components, particularly of the filter in the pickup pot. By integrating the mounting structure for the filter and for the fuel return line into the pickup pot, there is no need for special mounting components which substantially reduces costs and assembly requirements.

Preferably, the pickup pot includes a clip structure for engaging the filter so that the filter can be rapidly and easily snapped into place which greatly facilitates assembly.

For mounting the fuel return line, the pickup pot preferably includes an upright pipe-receiving socket with an axially extending discharge slot which directs the fuel returning from the engine toward the pickup pot wall. The pickup pot serves to calm the fuel within a tank and as a collection space for the heated fuel returning from the engine. The pickup pot prevents an uncontrolled dispersal of the heated return fuel during operation and accordingly limits the amount of fuel in the tank being heated during fuel circulation. The warm return fuel discharged from the fuel return line is directed toward the pickup pot wall and is there redirected in a curved flow path back to the fuel suction line such that an orderly flow pattern is established in the pick up pot from the discharge slot of the mounting socket back to the fuel suction line. The return fuel flows in the pickup pot over a relatively large travel path during which any gas bubbles can be discharged into the fuel tank. Consequently, there is no need for a separate external degasification arrangement.

Furthermore, the arrangement provides within the pickup pot for a good mixture of heated return fuel with fresh cool fuel at a ratio of about 1:1. In this way, the fuel supplied to the engine by way of the fuel suction line is appropriately preheated which is particularly advantageous during cold weather operation. Consequently, there is also no need for a separate fuel pre-heater. Blockage of the filter during winter operation by paraffin deposits is prevented as the fuel is pre-heated by the warm return fuel before it passes through the filter.

Preferably, the pickup pot has a web structure at the bottom of the filter mounting area on which the return fuel line is seated and which prevents the fuel line intake opening from being blocked during assembly. The web structure serves as a stop for the filter during assembly and prevents the suction line from abutting the bottom wall of the pickup pot and blocking of the suction line. Even if the suction line engages the web structure, there remains a sufficiently large flow opening for full-load operation of the engine.

If the pickup pot has inlet openings at its lower end, fuel supply is assured even when the fuel level in the tank falls below the top edge of the pickup pot for example by centrifugal forces when vehicle is negotiating curves.

Further embodiments and advantage of the invention will become apparent from the description thereof on the basis of the accompanying drawings.

BRIEF DESCRIPTION OF THE DRAWINGS

FIG. 1 is a cross-sectional view of a fuel removal device with a pickup pot taken along line I—I of FIG. 3 wherein the pickup pot has two receptacles one receiving a filter with a fuel suction line and the other receiving a fuel return line, FIG. 2 is a cross-sectional view taken along line II—II of FIG. 3 showing the filter receptacle formed integrally with the pickup pot with clips for engaging the filter, and FIG. 3 is a cross-sectional view taken along line III—III of FIG. 1 with a filter snapped into the filter receptacle and showing the return fuel flow pattern and fuel passages indicated by dashed lines.

DESCRIPTION OF A PREFERRED EMBODIMENT

FIGS. 1 to 3 show a fuel removal device 1 which comprises a fuel pickup pot 2 disposed in a fuel tank which is however not shown. The fuel pickup pot 2 receives a fuel return line 3 and a fuel suction line 4 with a filter 5. The fuel removal device is a component which is to be mounted into the fuel tank for example of a vehicle and which may also include a fuel level sensor.

As shown in FIGS. 1 and 2, the lower part of the fuel suction line 4 is disposed within a cylinder-like filter 5. At its upper end, the filter 5 includes a fit 6 into which the fuel suction line 4 is firmly inserted.

The pickup pot 2 includes two integrally formed receptacles 8 and 9 extending in the direction of the longitudinal axis 7 of the fuel removal device for receiving the fuel return line 3 and the filter 5. As shown in FIG. 3, the receptacles 8 and 9 are disposed adjacent each other along a diameter line of the pickup pot 2 so as to provide separate fuel spaces at opposite sides of the two receptacles. The receptacle 8 for the fuel return line 3 comprises a tubular socket 10 which at its upper end, is provided with a guide shoulder 11 onto which the fuel return line 3 is mounted. The tubular socket 10 has a discharge slot 12 extending in the direction of the longitudinal axis 7 and opening into the fuel space at one side of two receptacles 8, 9 whereby the fuel leaves the the socket 10 in a direction toward a wall a 2a of the pickup pot 2. At the wall area 2a the fuel flow is diverted toward the fuel suction line 4 (see FIGS. 1 and 3 where the flow path is indicated by arrows).

The pickup pot 2 includes a bottom 13 which, in the area 13a of the receptacle 9, for the filter 5 includes a web structure 14 on which the fuel suction line 4 is seated if it is inserted into the filter excessively far.

As shown in FIG. 2, the receptacle 9 for the filter 5 comprises nose-like clip portions 15 which snap over an annular mounting ring 16 at the bottom of the filter 5 when the filter is inserted into the receptacle 9. However, other snap-in mounting structures may be provided for retaining the filter 5 in the filter receptacle 9.

As shown in FIG. 3, fuel admission bores 18 extend through the fuel pickup pot 2 near its bottom end 17. The fuel admission bores 18 insure fuel supply to the fuel pickup pot 5 when the fuel level in the fuel tank falls below the top edge 19 of the pickup pot 2.

What is claimed is:

1. A fuel removal device including a fuel pickup pot of circular cross-section for disposition in a vehicle fuel tank, said fuel pickup pot having a bottom and integrally formed therewith, two cylindrical receptacles extending from said bottom, one for receiving a filter with a fuel suction line and the other for receiving a fuel return line, said one receptacle having a diameter larger than said other receptacle and both receptacles being disposed side-by-side and in contact with the walls of said pickup pot so as to form separate spaces within said pickup pot at opposite sides of said two circular receptacles, said other receptacle for receiving said fuel return line including, at least at one side thereof, an axial slot opening into one of said separate spaces and oriented toward a wall portion of said fuel pickup pot for directing fuel discharged from said return line toward said wall portion so as to permit the escape of any gas bubbles and for mixture with fresh fuel before the fuel returns to said fuel suction line.

2. A fuel removal device according to claim 1, wherein said fuel filter-receiving receptacle is provided with at least one clip structure for engaging said filter when it is inserted into said one receptacle.

3. A fuel removal device according to claim 1, wherein a web structure is disposed on the bottom of said one receptacle for engaging said fuel suction line when installed in said fuel filter in said fuel pickup pot.

4. A fuel removal device according to claim 1, wherein fuel admission bores extend through said fuel pickup pot adjacent the bottom thereof.

* * * * *